United States Patent [19]

Oliver

[11] Patent Number: 4,885,081
[45] Date of Patent: * Dec. 5, 1989

[54] DRINKING WATER DELIVERY SYSTEM WITH PURITY INDICATOR

[75] Inventor: Bruce J. Oliver, Las Vegas, Nev.

[73] Assignee: Aquest, Inc., Las Vegas, Nev.

[*] Notice: The portion of the term of this patent subsequent to Nov. 18, 2003 has been disclaimed.

[21] Appl. No.: 107,861

[22] Filed: Oct. 7, 1987

Related U.S. Application Data

[63] Continuation of Ser. No. 912,584, Sep. 29, 1986, abandoned, which is a continuation of Ser. No. 703,137, Feb. 19, 1985, Pat. No. 4,623,451.

[51] Int. Cl.[4] ............................................. C02F 1/44
[52] U.S. Cl. ........................................ 210/87; 210/93
[58] Field of Search ................ 210/85, 92, 93, 96.1, 210/96.2, 87, 257.2; 340/603, 620, 627; 222/23, 25; 422/119

[56] References Cited

U.S. PATENT DOCUMENTS

| | | | |
|---|---|---|---|
| 2,987,187 | 6/1961 | Comroe | 210/96.1 |
| 3,334,745 | 8/1967 | Burgess et al. | 210/93 |
| 3,799,344 | 3/1974 | Nishizawa | 210/96.1 |
| 3,856,676 | 12/1974 | Grimme, Jr. et al. | 210/96.1 |
| 3,967,638 | 7/1976 | Tondreau | 210/257.2 |
| 3,990,066 | 11/1976 | Malmgren | 210/85 |
| 4,082,666 | 4/1978 | Jones et al. | 210/93 |
| 4,231,872 | 11/1980 | Keil | 210/93 |
| 4,498,982 | 2/1985 | Skinner | 210/96.2 |
| 4,623,451 | 11/1986 | Oliver | 210/87 |

FOREIGN PATENT DOCUMENTS 2128176 4/1984 United Kingdom .............. 210/96.1

OTHER PUBLICATIONS

"Nalcometer BBL Analytical Equipment", Product Bulletin MS-Code C0038, Nalco Chemical Company, 1974.
"Product Design & Development", Conductivity Control advertisement by Sensor Electronics, Inc., p. 63, Nov. 1981.
"SPS Filterchem" catalog, Special Plastic Systems, Inc., p. 69, Illustrating Purity Light Base for Liquid Dispensers.
"Touch-Flo" one-page brochure on Faucet Models E-6, E-6MC, 0-3F and SB-10F.
"Presto-Tek" Corp., one-page specifications on Model CM-20 Battery-Powered Conductivity Indicator.
Instructions for "Pure (R/O) Test".

Primary Examiner—Ivars Cintins
Attorney, Agent, or Firm—Baker, Maxham, Jester & Meador

[57] ABSTRACT

A plastic faucet having built in LEDs and a pair of electrodes is mounted above a sink for dispensing water from a reverse osmosis purification apparatus installed below the sink or in another remote location. A circuit connected to the electrodes senses the purity of the water dispensed through the faucet each time the valve in the faucet is turned on and illuminates one of the LEDs to automatically indicate on-sight the level of purity to the user. Each time the user dispenses water from the third faucet a visual signal is received which either confirms to the user that the water has an acceptable level of purity or notifies the user that servicing of the purification apparatus is required. An alternate embodiment adapted for use with filtration type purification apparatus has a flow limiter in the faucet and a circuit which adds the time that the valve in the faucet is turned on. The circuit illuminates an LED in the faucet when the cumulative valve on time indicates that a predetermined amount of purified water has been dispensed and that it is time to service the purification apparatus.

7 Claims, 3 Drawing Sheets

U.S. Patent     Dec. 5, 1989     Sheet 2 of 3     4,885,081
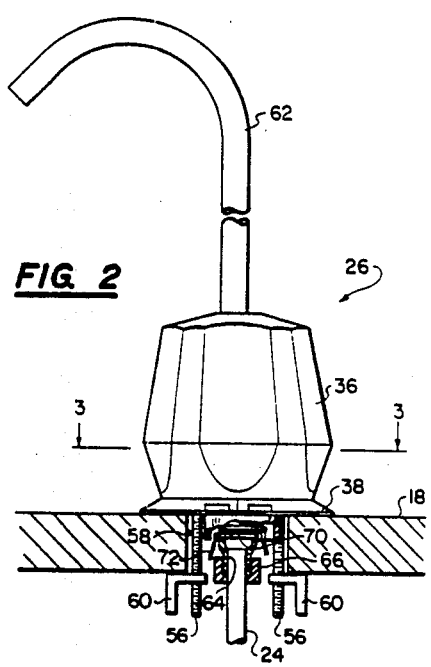
FIG. 2
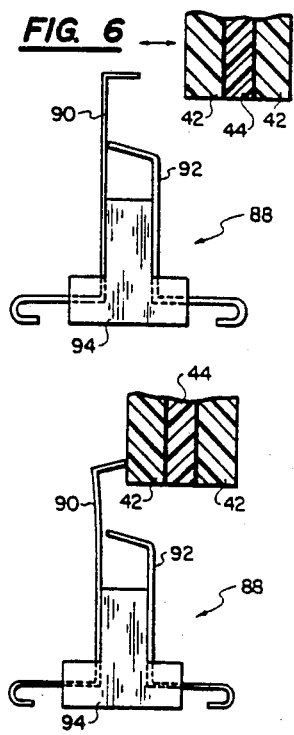
FIG. 6
FIG. 5
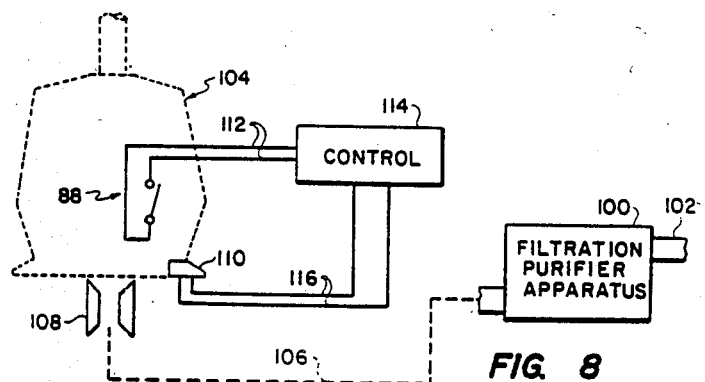
FIG. 8

DRINKING WATER DELIVERY SYSTEM WITH PURITY INDICATOR

This is a continuation of application Serial No. 912,584 filed on September 29, 1986, now abandoned, which was in turn a continuation of application Serial No. 703,137 filed February 19, 1985 and now U.S. Pat. No. 4,623,451 granted.

BACKGROUND OF THE INVENTION

The present invention relates to systems for purifying and dispensing drinking water in the home, and more particularly, to a system which provides a visual signal above the sink confirming an acceptable level of purity of water supplied by a below-the-sink or otherwise remote reverse osmosis purification apparatus each time the water is dispensed to the user from a third faucet mounted above the sink.

In many areas the water supplied to homes by water companies through underground pipes, wells or other sources contains high levels of dissolved solids, such as minerals, as well as agricultural nutrients, insecticides and other dangerous chemicals. These dissolved solids and chemicals can give the water an unpleasant taste. Because of the bad taste and the health hazards posed by such contaminants in the water many persons drink purified bottled water purchased at grocery stores or delivered by bottled water companies on trucks. Bottled water is relatively expensive and it is cumbersome to deliver and handle the bottles. Therefore, home water purification apparatuses have been developed and are now in widespread use. Typically such an apparatus is installed below the kitchen sink and is connected directly to the incoming sink cold water line. The purification apparatus removes a substantial amount of the dissolved solids, chemicals and other impurities before delivering the purified water through a third faucet secured to the kitchen sink next to the conventional hot and cold water taps. The percentage removal of dissolved solids, chemicals and other impurities by the purification apparatus indicates the initial and continuing relative efficiency of the apparatus.

A common household water purification apparatus is the reverse osmosis type in which water is forced through a semipermeable membrane. This membrane is contained in a removable module inside a pressure vessel. The purified water is temporarily stored in an accumulator connected to the third faucet. The efficiency of a reverse osmosis apparatus in removing dissolved solids from the incoming water begins to decline significantly once a given volume of water has been processed, for example, several hundreds of gallons. The removable module in the purification apparatus must then be replaced with a new one by a maintenance person or a skilled user to ensure that it once again delivers pure water having a concentration of dissolved solids which is below a safe maximum. In extreme cases the module may rupture or otherwise fail mechanically and will cease to function at all.

Reverse osmosis water purification apparatuses which are presently in widespread use are typically serviced when the user calls the rental or service dealer to complain that the water from the third faucet tastes bad or when the user feels that enough time has elapsed to warrant servicing. The dealer then instructs the user to fill a vial with a sample of water from the third faucet and mail or otherwise deliver the sample to the company for testing. If the test indicates that service is necessary, the service personnel is dispatched to the user's location to replace the module and check out the purification apparatus. By the time that the purification apparatus is serviced it is possible that the user will have consumed a significant amount of impure water. This is especially so if unsafe water was dispensed even before it began to taste bad or tests were made. If the test indicates that the water is still acceptably pure, then the company informs the user that servicing is not yet necessary. Either way the inefficiencies of such communication and testing result in inaccuracies, extra expense and lost time.

Regular scheduled maintenance on the purification apparatus is also not a desirable approach. A family may use the third faucet often enough so that membrane in the module degrades and unsafe water is consumed before the service personnel can correct the problem on a scheduled visit. Thus the water delivered by the purification apparatus may contain an unacceptably high level of impurities. However the level may not be high enough to be perceived by taste and the family may not know that they should have the purification apparatus serviced earlier than scheduled. On the other hand, a family may use the third faucet so infrequently that the water delivered by the purification apparatus may still be very pure when tested by the maintenance personnel on his or her regularly scheduled service call. If the service call was not yet necessary the result is wasted time and expense.

Without some sort of readily observed purity indicator a person dispensing water from the third faucet simply cannot be sure that they are consuming pure water at any given time. This may cause anxiety in many people, and in health conscious individuals in particular. Moreover, actual harmful effects on an individual's health can result from the consumption of impure water. For example, some regions have naturally occurring arsenic, high fluorides or asbestos fibers in the water supply which can be reduced to safe levels by a properly functioning purification apparatus.

SUMMARY OF THE INVENTION

It is therefore the primary object of the present invention to provide an improved system for delivering water from a purification apparatus.

It is another object of the present invention to provide a system for providing a signal each time water is dispensed from a third faucet that will confirm that the water being dispensed has an acceptable level of purity.

Another object of the present invention is to provide a system for automatically testing the purity of water delivered by a reverse osmosis water purification apparatus each time that the third faucet connected to the apparatus is turned on by a user.

Another object of the present invention is to provide a system that will test the purity of water delivered by a reverse osmosis purification apparatus at the last point in the delivery system so that a more accurate reading of the average purity of the water being dispensed will be taken.

Another object of the present invention is to sense the purity of water in an under sink purification apparatus using electrodes and circuitry that will minimize power consumption and reduce or eliminate plating or build-up of salts or minerals on the electrodes.

Yet another object of the present invention is to provide a system which gives different visual signals adjacent a third faucet to indicate whether the water being dispensed from a purification apparatus is "good" or if service is required to make the water safe to drink.

Still another object of the present invention is to provide a combination third faucet, purity sensor and purity indicator which can be installed in a sink from above.

It is another object of the present invention to provide a simple water purification sensing system of the general character referred to above which can be readily adjusted to indicate different predetermined levels of concentrations of dissolved solids and to provide notice at a safe point where service is required.

Another object of the present invention is to provide an above the sink water purity indicator system of the type referred to above which can be easily retrofitted into existing below the sink reverse osmosis water purification systems now in widespread use.

Another object of the present invention is to provide a variation of the system adapted for use with an under sink filtration type water treatment apparatus which gives a visual warning signal to the user once a predetermined amount of water has been dispensed indicating that it is time to replace the filter cartridge.

According to a first embodiment of my invention a plastic faucet having built in LEDs and a pair of electrodes is mounted above a sink for dispensing water from a reverse osmosis purification apparatus installed below the sink or in another remote location. A circuit connected to the electrodes senses the purity of the water dispensed through the faucet each time the valve in the faucet is turned on and illuminates one of the LEDs to automatically indicate on-sight the level of purity to the user. Each time the user dispenses water from the third faucet a visual signal is received which either confirms to the user that the water has an acceptable level of purity or notifies the user that servicing of the purification apparatus is required. A second embodiment of my invention is adapted for use with filtration type purification apparatus. It has a flow limiter in the faucet and a circuit which adds the time that the valve in the faucet is turned on. The circuit illuminates an LED in the faucet when the cumulative valve on time indicates that a predetermined amount of purified water has been dispensed and that it is time to service the purification apparatus.

BRIEF DESCRIPTION OF THE DRAWINGS

FIG. 2 is an enlarged vertical section view with portions broken away of the third faucet of the first embodiment. The control knob of the third faucet valve is illustrated in phantom lines.

FIG. 5 is an enlarged side elevation view illustrating the open position of the switch in the third faucet of the first embodiment when the valve is closed.

FIG. 6 is a view similar to FIG. 5 illustrating the closed position of the switch when the valve is open.

FIG. 8 is a simplified diagrammatic illustration of a second embodiment of my invention adapted for use with an under sink filtration type water purification apparatus.

DESCRIPTION OF THE PREFERRED EMBODIMENTS

Figure 1:
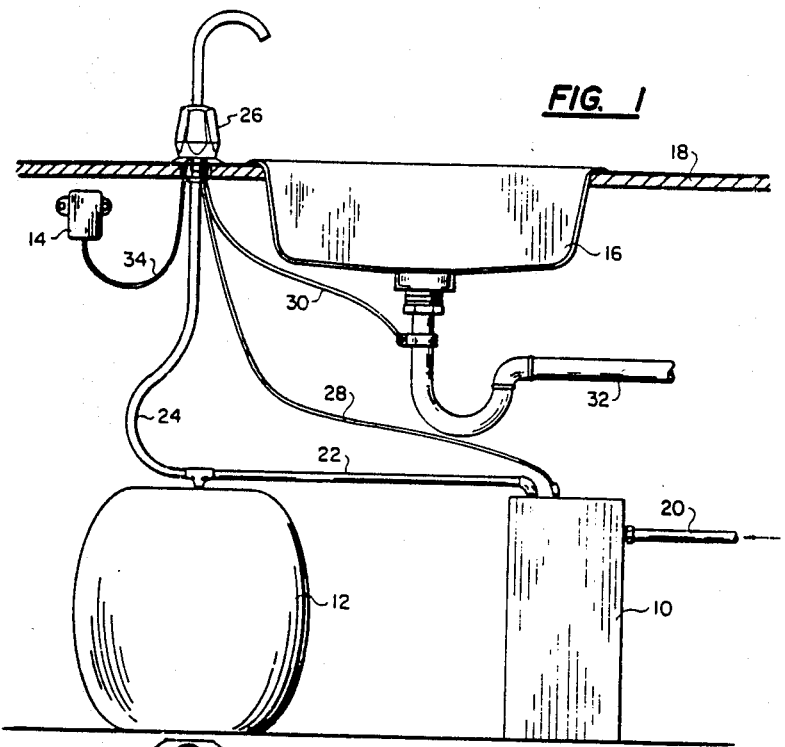
FIG. 1 is a simplified diagrammatic illustration of a first embodiment of my invention adapted for use with an under sink reverse osmosis water purification apparatus.

Referring to FIG. 1, a first embodiment of my invention includes a reverse osmosis purification apparatus 10, a hydropneumatic tank or accumulator 12, and an electronic circuit housing 14 mounted beneath a sink 16 supported by a counter top 18. The reverse osmosis (RO) apparatus may be of the conventional type. Details for such an RO apparatus are disclosed in U. S. Pat. No. 3,365,061 of Donald T. Bray entitled "Portable Reverse Osmosis Apparatus", U.S. Pat. No. 3,367,505 of Donald T. Bray entitled "Semipermeable Membrane Backing and Support Medium", U.S. Pat. No. 3,417,870 of Donald T. Bray entitled "Reverse Osmosis Purification Apparatus" and U.S. Pat. No. 3,493,496 of Donald T. Bray and Ross M. Brown entitled "Purified Water Supply Apparatus and Method."

The RO apparatus 10 (FIG. 1) is connected to a source of incoming pressurized water from water pipe 20 which is connected in turn to a municipal water supply, for example. When properly functioning the RO apparatus removes a significant amount of dissolved solids, chemicals, suspended solids, bacteria, asbestos, high fluorides, etc. from the incoming water and delivers the treated or purified water to the tank 12 via water line 22. Since the RO apparatus processes water at a relatively slow rate several gallons are stored in the tank 12 so that an adequate flow of purified water will be available upon demand by the user at any given time. The hydropneumatic tank 12 is of conventional construction and incorporates an air bag or diaphragm which is compressed by the water pressure and which causes stored purified water to be delivered via water line 24 to a third faucet 26 mounted above the sink 16.

Removed dissolved solids and other impurities are carried by waste water via water line 28 (FIG. 1) to a conventional air gap arrangement in the third faucet and then through water line 30 to a drain pipe 32 connected to the sink. This air gap arrangement is required by some government codes or regulations to insure that waste water does not back up into the municipal water supply and cause contamination. A circuit within the housing 14 is connected via electrical bus 34 to switch, sensor and LED devices in the base of the third faucet 26.

Referring to FIG. 2, the third faucet 26 is generally of the type disclosed in U.S. Pat. No. 4,276,753 granted May 14, 1985 entitled "Faucet Device with Replaceable Valve Cartridge" and having named inventor Jack W. Thomsen. The entire disclosure of the aforementioned patent application is specifically incorporated herein by reference. Except where otherwise noted the parts of the faucet are made of molded plastic. The third faucet has a handle or knob 36 which is rotatable on structure hereafter described situated above a disk 38 for operating an in-line valve 40 (FIG. 3) which extends vertically within the knob. When the knob is manually rotated a pair of fingers 42 which extend radially inwardly therefrom move an arm 44 of a sleeve valve member (not visible). The sleeve valve member moves axially up and down inside an elongate vertical valve body 46 as it is rotated to thereby seat and unseat a plug against a seal, which in turn opens and closes the water pathway in the valve. Further details of the valve operation are discussed in the aforementioned U.S. Pat.

The valve body 46 (FIG. 3) extends through and is supported by a stationary round mounting base 48. This base is rigidly mounted on top of the disk 38 and through the counter top 18. The periphery of the mounting base 48 serves as a support and rotational guide for the bottom of the knob 36. A metal torsion spring 49 surrounds the valve body 46 and hooks around the arm 44. This spring urges the sleeve valve member and the knob 36 in a clockwise direction to their closed positions. When the knob is rotated fully counter-clockwise to open the valve completely, which consists of slightly less than one hundred degrees of revolution, a first tab 50 which extends upwardly from the base 48 deflects inwardly to allow a boss 52 on the inner rim of the knob to go past. One of the fingers 42 on the knob then strikes a second tab 54 to inhibit further counter-clockwise rotation of the knob. The boss 52 then retains the knob and prevents the spring 49 from rotating the knob clockwise to close the valve. This way the user can leave the third faucet on without holding the knob in order to use both hands in filling a coffee pot, for example. Alternatively, the knob can be rotated counter-clockwise less than the full amount to dispense water and the torsion spring will automatically turn off the water when the knob is released.

Referring again to FIG. 2, the mounting base 48 is connected to and rests on top of the disk 38. Metal screws 56 (FIGS. 2 and 3) extend through guide sleeves formed in the mounting base 48, through the disk 38, and through a hole 58 (FIG. 2) in the counter-top 18. Metal clips 60 are threaded over the screws 56. The clips are rotated inwardly so that they can be inserted through the disk 38 and the hole 58 in the counter-top. The clips 60 are then rotated outward and are tightened against the underside of the counter-top 18 to rigidly secure the third faucet 26 in position. A spout or pipe 62 is connected at its lower end to the upper end of the in-line valve 40. The curved discharge end of the pipe 62 extends over the sink 16. Alternatively the sink may have a preformed hole in the outer flange thereof for mounting the third faucet.

Referring to FIG. 2, the lower end of the in-line valve body 46 terminates in a hollow, externally threaded cylinder 64. The pure water line 24 from the RO apparatus is connected to this cylinder via screw on coupling 66. A basin 68 (FIG. 3) is formed in the mounting base 48 and catches waste water from a small, inverted hook shaped pipe (not illustrated) which is coupled to the waste water line 28 (FIG. 1) to provide an air gap arrangement. Waste water drains from the basin 68 through the drain line 30 to the drain pipe 32.

Continuing with FIG. 2, a pair of cylindrical stainless steel electrodes 70 extend through the lower cylinder portion 64 of the valve 40 in horizontal, spaced apart relationship. These electrodes are inserted in and extend through the walls of the cylinder and a water tight seal provided by silicon sealant or other suitable means. The electrodes 70 are connected to corresponding insulated electrical wires 72 which are in turn connected to the electrical bus 34 (FIG. 1).

The disk 38 (FIG. 4) has a central opening 74 through which the valve body 46 and the mounting screws 56 extend. The mounting base 48 (FIG. 3) is supported by and rests on top of the disk 38. A green LED 76 and a yellow LED 78 (FIG. 4) are mounted inside water proof housings 80 and 82 respectively which are in turn positioned in receptacles adjacent to peripheral faces 84 and 86 of the disk 38. The housings 80 and 82 are made of a clear plastic material and function as lenses through which the light emitted by their corresponding LEDs is visible externally of the disk above the sink 16. The leads of the LEDs (not illustrated in FIG. 4) are electrically connected to wires (not illustrated in FIG. 4) which are routed in a waterproof and insulated manner to the electrical bus 34 (FIG. 1).

Figure 3:
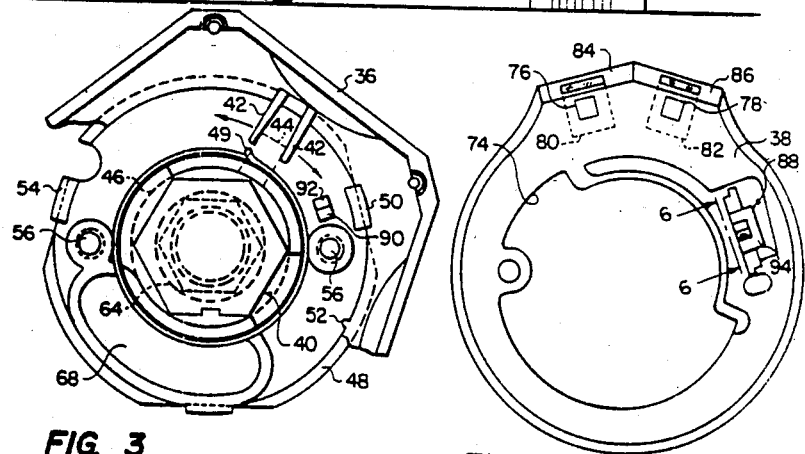
FIG. 3 is an enlarged fragmentary horizontal section view of the third faucet of the first embodiment taken along line 3—3 of FIG. 2.
Figure 4:
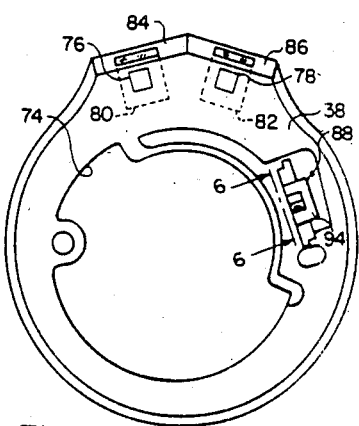
FIG. 4 is an enlarged top plan view of the LED disk of the first embodiment.

An electrical on/off switch 88 (FIGS. 4-6) is mounted on the disk 38 and a pair of springy, resilient berillium copper contacts 90 and 92 thereof extend vertically through a hole in the mounting base 48 as illustrated in FIG. 3. The contacts are connected to a plastic T-shaped spacer block 94 (FIGS. 4 and 5) which is formed, glued or otherwise secured to the disk 38. Each of the contacts has an inverted L-shaped upper portion and a horizontal hook shaped lower portion. The contact 90 extends above the contact 92. When the knob 36 and the valve 40 are in their closed positions, one of the fingers 42 of the knob deflects the contact 90 away from the contact 92 as illustrated in FIG. 5 thus resulting in an open switch. When the knob and valve are rotated counter-clockwise to their open positions, the finger 42 moves away from the contact 90, permitting it to spring back into physical and electrical contact with the contact 92 as illustrated in FIG. 6, thus resulting in a closed switch. The lower hook-shaped portions of the contacts 90 and 92 are connected through leads not illustrated in FIG. 4 to the electrical bus 34.

Figure 7:
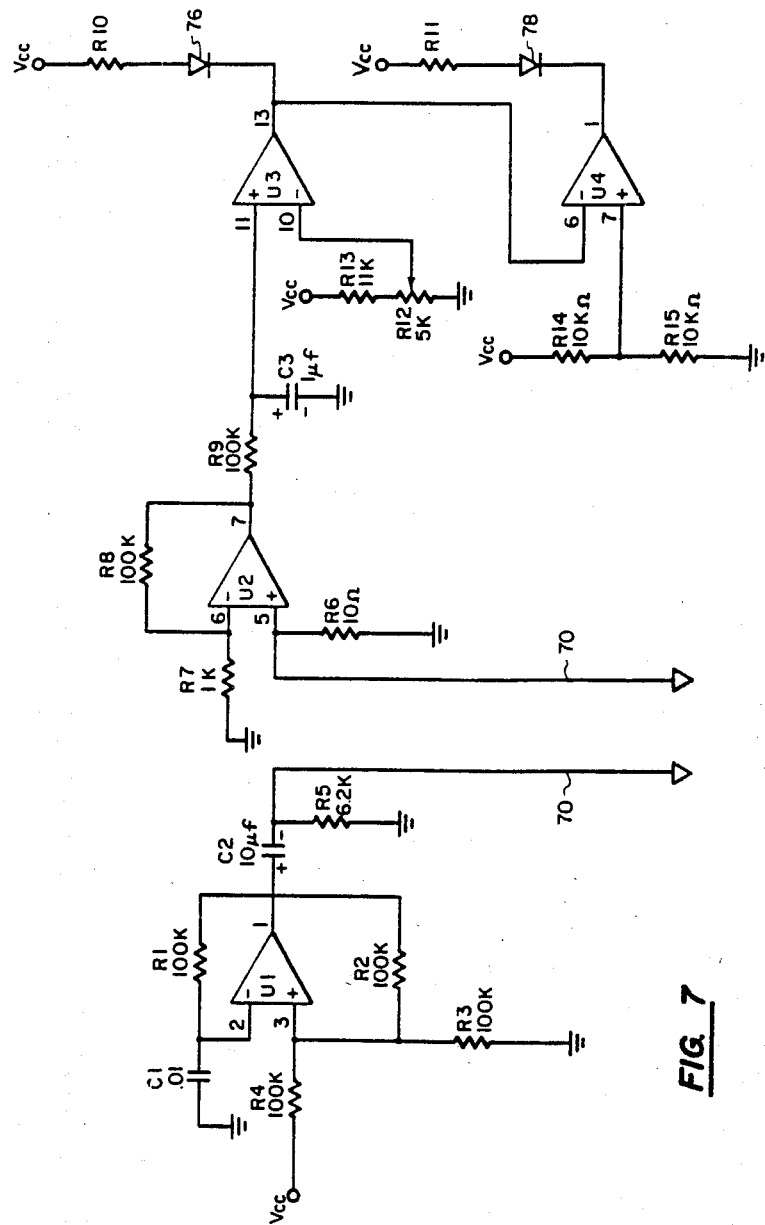
FIG. 7 is a schematic diagram of the circuit of the first embodiment.

FIG. 7 illustrates an electronic circuit utilized in the first embodiment of my invention. The electronic components of the circuit are mounted on and connected by a printed circuit board (not illustrated) which is contained within the electronic circuit housing 14 (FIG. 1) secured to a wall under the sink 16. The circuit is connected to the LEDs 76 and 78 (FIG. 4), switch 88 and electrodes 70 via the electrical bus 34 (FIG. 1).

The circuit of FIG. 7 tests the water in the valve 40 of the faucet 26 to determine its level of purity just prior to being dispensed. The water is tested at the last point in the delivery system so that a more accurate reading of the purity of the water being dispensed will be taken. This is particularly important in RO systems because pressure fluctuations in the system result in varying efficiencies of the membrane in removing impurities. At the last point in the delivery system there is an averaging of the purest and least pure water. Therefore by sensing the purity of the water at this point an average purity reading will be taken.

The circuit of FIG. 7 tests the water in the cylinder portion 64 (FIG. 2) to determine its conductivity using electrodes 70. The sensed conductivity is in most cases indicative of the amount of dissolved solids present in the treated water present in the cylinder. The percentage removal of chemicals, bacteria, and other impurities generally varies with the percentage removal of dissolved solids. Therefore, by sensing the conductivity of the treated water in the valve 40, an accurate reading of the overall level of purity of the treated water can be derived.

A simple conductivity measurement can be made with a meter, conductive probes, and a battery. However, over time this method causes salts present in the water to coat the electrodes because of an electrolytic reaction. This results in drift and inaccurate conductivity readings. The circuit of FIG. 7 overcomes this problem by applying a pulsating DC current to the electrodes 70. The electrolytic reaction is cancelled out and a more accurate steady reading of the conductivity of the treated water is taken.

Referring to FIG. 7, the circuit includes a pair of operational amplifiers U1 and U2 and a pair of comparators U3 and U4. The operational amplifiers may be provided by an LM358 integrated circuit commercially available from National Semiconductor Corporation. The comparators may be provided by an LM339 integrated circuit also commercially available from National Semiconductor Corporation. A square wave signal is generated by op amp U1. Resistor R1 and capacitor C1 determine the frequency of the square wave signal. The ratio of resistor R3 to resistor R2 and the ratio of resistor R2 to resistor R4 determine the pulse and width of the square wave signal.

Continuing with FIG. 7, the output of op amp U1 repetitively swings between the positive and negative saturation voltages which in the illustrated circuit are Vcc and ground. When the output of the op amp equals Vcc the output will remain in this state until the voltage across C1 has built up to approximately +0.15 volts. As the negative input voltage to the op amp U1 tries to increase further, the input difference voltage to the op amp U1 becomes more negative and the output of the op amp U1 switches to −V saturation or ground. The output of the op amp U1 then remains in this state until the +0.15 voltage across C1 has been driven by the negative output back down to zero. An instant later the voltage at the negative input of U1 becomes less negative than the voltage at the positive input and the output of the op amp U1 swings back to Vcc and the cycle repeats. Capacitor C2 and resistor R5 filter out any stray DC components.

The square wave signal from the op amp U1 (FIG. 7) is applied to a first one of the electrodes 70. This signal is passed through the water and a portion thereof is received by a second one of the electrodes 70. This receiving electrode is connected to the positive input of the op amp U2, which is set up as a non inverting amplifier. Op amp U2 multiplies the signal received by the second electrode according to the ratio of resistors R8 to R7. Resistor R9 and capacitor C3 are used to smooth the output so that the signal transmitted to the comparator U3 is concise.

A trip point or target purity level is set by resistor network R12 and R13. R12 is a potentiometer which may be adjusted to vary the target purity level. For example, if the voltage is adjusted to one volt at pin 10 of comparator U3, any water in the valve yielding an output at pin 7 of op amp U2 of less than one volt would cause the green LED 76 to be energized. As the quality of the treated water passing through the third faucet decreases the output at pin 7 of op amp U2 becomes larger. When the positive input of the comparator U3 becomes greater than one volt, the green LED 76 is no longer energized. The output of the comparator U3 swings to Vcc which is approximately the voltage of the battery (not illustrated) which powers the circuit. This battery is preferably a nine volt alkaline cell.

The other comparator U4 (FIG. 7) has a voltage of approximately one-half the battery voltage at its positive input via resistors R14 and R15. When the comparator U3 switches to Vcc the negative input of the comparator U4 becomes greater than its positive input, thus driving it low. The comparator U4 then energizes the yellow LED 78 to indicate that the purity of the treated water being dispensed through the third faucet has decreased below the preset target purity level.

It will be understood that the circuit of FIG. 7 is only operative when the knob is rotated from its closed position to open the valve 40. This closes the switch 88 (FIG. 4) and causes either the green LED or the yellow LED to be illuminated. By charging one of the electrodes with a pulsating or intermittent signal salts do not build up on the electrodes which would cause inaccuracies in the purity measurements. Also, the use of an intermittent signal for charging one of the electrodes conserves battery power so that the system can operate for many months of normal operation before the battery is drained. When the valve is opened, if neither LED is illuminated, this indicates a dead battery, so the system is self-correcting.

The first embodiment of my invention may be readily adjusted to indicate a particular acceptable level of purity of the treated water being dispensed. For example, when the system is being installed the third faucet may be connected to the circuit and inverted. The cylindrical portion 64 (FIG. 2) of third the faucet valve which contains the electrodes may be filled with, for example, fifty percent unpurified tap water and fifty percent distilled water. The potentiometer R13 (FIG. 7) may then be turned until the yellow LED is first illuminated. Thereafter, the third faucet may be attached to the sink and used normally. Each time the faucet is turned on the green LED will be energized until the the RO apparatus reaches a point where its removable module containing the membrane no longer removes more than fifty percent of the dissolved solids from the incoming water. At this point the yellow LED will be illuminated instead of the green LED. This same technique may be used to preset a wide range of target purities. As already mentioned, it can be empirically deduced that a ninety percent reduction, for example, in the amount of dissolved solids will reflect quantitatively determinable reductions in the amount of chemicals and other impurities.

Referring to FIG. 8, a second embodiment of my invention is adapted for use with a filtration type water purification apparatus 100 mounted below the sink or in another remote location. This apparatus is connected to incoming water pipe 102 and delivers water from which impurities have been filtered to a third faucet 104 through water line 106 illustrated in phantom lines. The third faucet 104 is similar to the third faucet 26 of my first embodiment except that the third faucet 104 has a flow limiter 108 in the cylinder portion of the valve instead of the electrodes. The flow limiter could be in other locations, for example, inside the spout 62. The third faucet 104 also has only a single yellow LED 110 mounted in the disk portion of the faucet directly above the counter top. The switch 88 of the third faucet 104 is connected via wires 112 to a control circuit 114. The LED 110 is connected to the control circuit via wires 116. The flow limiter 108 permits purified water to be delivered through the third faucet 104 at a predetermined constant flow rate under normal operating pressure. Therefore the amount of purified water delivered by the third faucet is directly a function of how long the valve is on. Each time the valve is turned on by rotating the knob, the switch 88 is closed and the control circuit 114 keeps a cumulative total of the "valve on" time. When the cumulative valve-on time reaches a preset maximum, the control circuit energizes the yellow LED 110 to advise the user that a given amount of water, e.g. 600 gallons, has been processed by the filtration purification apparatus 100 and that replacement of the filtration cartridge is required to once again ensure that safe water is being dispensed from the third faucet. The control circuit may have a relatively simple, battery powered circuit including digital timing, adding and comparing circuits for determining when the valve on time has exceeded a pre-programmed maximum.

Having described preferred embodiments of my purified water delivery system it will be apparent to those skilled in the art that my invention may be modified in both arrangement and detail. For example the LEDs could be flashed instead of steadily illuminated. A single LED could be used. An audible warning signal could be used. A solenoid operated ON/OFF valve could be connected for turning off the supply of water from the RO apparatus upon sensing an unacceptably high level of impurities. The luminus signal could be mounted above the sink separate from the third faucet. Other purity sensing devices besides a conductivity test could be utilized. The third faucet, switch and circuits could be widely varied. Therefore the protection afforded my invention should only be limited in accordance with the scope of the following claims.

I claim:

1. A drinking water delivery system for connection to a purification apparatus that receives water from a source and treats the water to remove an amount of unwanted substances from the water, comprising:

a pure water line connectable at a first and thereof to the purification apparatus for conveying treated water therefrom;

faucet means connected to a second end of the pure water line and being manually operable from an OFF condition to an ON condition for dispensing the treated water;

means for providing a visual or audible signal to a person when energized;

a switch actuated in response to the ON condition;

a pair of electrodes;

means for mounting the electrodes for contacting the treated water conveyed through the pure water line; and circuit means connecting the switch, the electrodes and the signal providing means for charging the electrodes to thereby determine a level of purity of the treated water being dispensed only during the ON condition, and for thereafter energizing the signal providing means only when the treated water has a level of purity above or below a predetermined target purity level.

2. A system according to claim 1 wherein the circuit means further includes means for intermittently charging the electrodes during the ON condition.

3. A system according to claim 1 wherein the circuit means includes means for adjusting the predetermined target purity level.

4. A system according to claim 1 wherein the faucet means includes a handle member rotatable to actuate the switch and also establish the OFF and ON conditions.

5. A system according to claim 4 wherein the faucet means includes a valve which is opened and closed by rotation of the handle member.

6. A system according to claim 1 wherein the signal providing means includes at least one LED.

7. A system according to claim 1 wherein the signal providing means includes a pair of illumination providing devices and the circuits means energizes a first one of the illumination providing devices when the treated water has a level of purity above the target level and energizes a second one of the illumination providing devices when the treated water has a level of purity below the target level.

* * * * *